(12) United States Patent
Forster et al.

(10) Patent No.: US 8,458,672 B2
(45) Date of Patent: Jun. 4, 2013

(54) FACILITATING THE UTILIZATION OF COMPLEX DATA OBJECTS

(75) Inventors: Craig Robert William Forster, Queensland (AU); Kerry Robert Gunn, Queensland (AU); Vernon Murdoch, Queensland (AU); Miguel Pedroza, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1147 days.

(21) Appl. No.: 11/778,857

(22) Filed: Jul. 17, 2007

(65) Prior Publication Data
US 2009/0024987 A1 Jan. 22, 2009

(51) Int. Cl.
*G06F 9/44* (2006.01)
*G06F 9/45* (2006.01)
*G06F 17/30* (2006.01)

(52) U.S. Cl.
USPC ............ 717/136; 717/106; 717/137; 707/798

(58) Field of Classification Search
None
See application file for complete search history.

(56) References Cited

U.S. PATENT DOCUMENTS

| | | | |
|---|---|---|---|
| 6,611,844 B1 | 8/2003 | Saulpaugh et al. | |
| 7,099,727 B2* | 8/2006 | Wu et al. | 700/104 |
| 7,694,284 B2* | 4/2010 | Berg et al. | 717/137 |
| 7,694,287 B2* | 4/2010 | Singh et al. | 717/143 |
| 7,716,653 B2* | 5/2010 | Fahmy et al. | 717/136 |
| 7,730,041 B2* | 6/2010 | Purdy et al. | 707/694 |
| 7,774,746 B2* | 8/2010 | Mansfield et al. | 717/106 |
| 7,814,124 B1* | 10/2010 | de Jong et al. | 707/798 |
| 2004/0083194 A1* | 4/2004 | Wu et al. | 706/45 |
| 2004/0205731 A1 | 10/2004 | Junkermann | |
| 2005/0066317 A1 | 3/2005 | Alda et al. | |
| 2005/0097527 A1 | 5/2005 | Chakrabarti et al. | |
| 2006/0047679 A1* | 3/2006 | Purdy et al. | 707/102 |
| 2006/0143227 A1* | 6/2006 | Helm et al. | 707/103 Y |
| 2007/0005613 A1* | 1/2007 | Singh et al. | 707/100 |
| 2007/0038985 A1* | 2/2007 | Meijer et al. | 717/137 |
| 2007/0061786 A1* | 3/2007 | Zhou et al. | 717/136 |
| 2009/0282394 A1* | 11/2009 | Raj | 717/136 |

OTHER PUBLICATIONS

Tyagi, S., et al., Core Java™ Data Objects, Prentice Hall, Sep. 11, 2003, 13 pages, [retrieved on Jan. 26, 2013], Retrieved from the Internet: <URL:http://techbus.safaribooksonline.com/>.*
Hericko, M., et al., Object Serialization Analysis and Comparison in Java and .NET, ACM SIGPLAN Notices, vol. 38, Issue 8, Aug. 2003, pp. 44-54, [retrieved on Jan. 25, 2013], Retrieved from the Internet: <URL:http://dl.acm.org/>.*
Schott, S., et al., Lazy XSL Transformations, Proceedings of the 2003 ACM symposium on Document engineering, 2003, pp. 9-18, [retrieved on Jan. 25, 2013], Retrieved from the Internet: <URL:http://dl.acm.org/>.*
Chen et al., "A Simple Typed Intermediate Language for Object-Oriented Languages", POPL'05, Jan. 2005, Long Beach, California, pp. 38-49.

* cited by examiner

*Primary Examiner* — Thuy Dao
*Assistant Examiner* — Geoffrey St Leger
(74) *Attorney, Agent, or Firm* — Yee & Associates, P.C.; Jeffrey S. LaBaw

(57) ABSTRACT

Computer implemented method, system and computer usable program code for facilitating utilization of data. A computer implemented method for facilitating utilization of data includes receiving data, wherein the received data is in a first representation. The received data is converted from the first representation to a common representation that is mapped to the first representation using an external configuration file. The common representation of the data is output to facilitate utilization of the data.

18 Claims, 5 Drawing Sheets

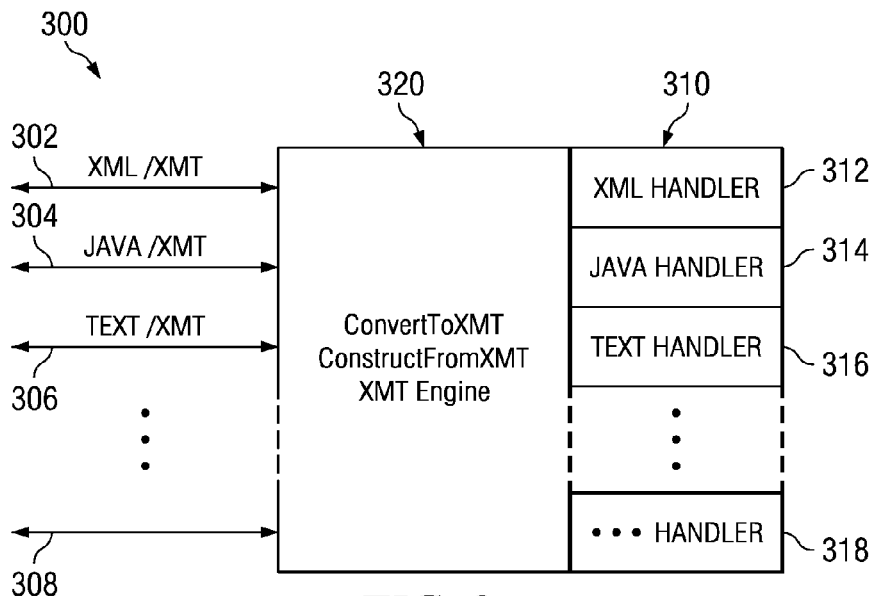

FIG. 3

```
400
<Permission>
    <Supported>
        <ClassID>javax.security.jacc.WebUserDataPermission</ClassID>
        <ClassID>javax.security.jacc.WebResourcePermission</ClassID>
        <ClassID>javax.security.jacc.WebRoleRefPermission</ClassID>
        <ClassID>javax.security.jacc.EJBRoleRefPermission</ClassID>
        <ClassID>javax.security.jacc.EJBMethodPermission</ClassID>
    </Supported>
    <Constructors>
        <Constructor>@Name@, @Actions@</Constructor>
    </Constructors>
    <Properties>
        <ClassName>@CLASS_STRING</ClassName>
        <Name>@STRING</Name>
        <Actions>@STRING</Actions>
    </Properties>
</Permission>
```

```
<Test>
    <Supported>
        <ClassID>com.ibm.test.TestObject</ClassID>
    </Supported>
    <Constructors>
        <Constructor>@Value@</Constructor>
    </Constructed>
    <Properties>
        <ClassName>@CLASS_STRING</ClassName>
        <Value>@STRING</Value>
    </Properties>
</Test>
```

```
<WrappedTest>
    <Supported>
        <ClassID>com.ibm.test.WrappedTestObject</ClassID>
    </Supported>
    <Constructors>
        <Constructor>@Wrapped@</Constructor>
    </Constructors>
    <Properties>
        <ClassName>@CLASS_STRING</ClassName>
        <Wrapped>@Test@</Wrapped>
    </Properties>
</WrappedTest>
```

```
<URNMappings>
    <Mapping>
        <Type>@STRING</Type>
        <URN>http://www.w3.org/2001/XMLSchema#string</URN>
        <DefaultType>java.lang.String</DefaultType>
    </Mapping>
</URNMappings>
```

```
900
<Mapping>
    <Type>@Permission@</Type>
    <URN>urn:ibm:xacml-java-security:data-type:java.security.Permission</URN>
    <DefaultType>java.security.Permission</DefaultType>
</Mapping>
```

FACILITATING THE UTILIZATION OF COMPLEX DATA OBJECTS

BACKGROUND OF THE INVENTION

1. Field of the Invention

The present invention relates generally to the data processing field and, more particularly, to a computer implemented method, system and computer usable program code for facilitating the utilization of complex data objects.

2. Description of the Related Art

Many applications require a mechanism for storing and persisting information. This information is commonly represented, processed and manipulated at runtime by wrapping it in Java™ objects, which may also provide functions external to the information. One example is the Java™ security "Permission" classes wherein, in addition to the information specifying the resource they are protecting, the implementing classes also provide an implies( ) method for runtime evaluation of access requests.

The inventors have recognized that a problem to be solved is how to extract and efficiently store data wrapped by an object such as a Java™ object while, at the same time, enable access to runtime functions that the object provides when they are needed. Furthermore, inasmuch as the primary target for the extracted data is some form of storage mechanism, the inventors have also recognized additional requirements that should also be satisfied in order to fully solve the problem.

First, the storage of large data sets implies a method for finding information within the sets. Therefore, the extracted data should be in a format that is conducive to searching. A common method for finding data is a parameter-value lookup, for example, finding all Permissions whose "Actions" parameter has the value "GET".

Second, the format of the extracted data should be independent of any individual storage mechanism as one method of storage is not suitable for all applications. One installation of a product may require support for a large number of objects with efficient lookup and between-session persistence, which could be implemented via a database backend; however, another installation may only require a small number of objects and no persistence, meaning using a database backend would have too much overhead. Thus, solution of the problem includes supporting conversions to different storage formats.

Third, it should not be necessary to have to modify existing classes, nor should newly implemented classes need to implement any extra interfaces.

A standard method for providing persistence for Java™ objects is to use the Object Serialization system. This method, however, has a number of deficiencies that make it unsuitable as a solution for the problem of extracting and efficiently storing data wrapped by a Java™ object while, at the same time, providing access to the runtime functions that the object provides. Such deficiencies include:

Data must be provided and read as streams, and therefore may not be in a human-readable form. Serializing data in a human-readable manner is desirable from a support perspective as visually inspecting data can greatly increase the ability to diagnose problems.

The default behavior is to store all information regarding an object, including private members. Private members of a class should be regarded as implementation details, and it may not be desirable from a security perspective to persist this data.

While it is possible to implement a custom format for serialized objects, all objects needing to be serialized must be modified to use this format. This means that existing classes cannot use a custom format without modification, and this may not be possible for SDK (Software Development Kit) or standard J2EE classes.

Also, Java™ serialization does not facilitate searching by attribute, ie, the Actions="GET" example referred to above would require that the bytecode be interpreted.

Solutions also exist for serializing objects as XML (extensible Markup Language) [such as XStream {http://xstream-.codehaus.org/}]. While these solutions provide a human-readable format for storage, they are tied to a single representation (XML) and more information is extracted than is necessary (private members). This causes XML serialization solutions to suffer from the same problem as Java™'s Object Serialization, i.e., they are too heavy-weight and inflexible.

There is, accordingly, a need for a mechanism for flexibly and efficiently facilitating the utilization of a complex data object such as a Java™ object or an XML object while, at the same time, providing access to runtime functions that the object provides.

SUMMARY OF THE INVENTION

Exemplary embodiments provide a computer implemented method, system and computer usable program code for facilitating utilization of data. A computer implemented method for facilitating utilization of data includes receiving data, wherein the received data is in a first representation. The received data is converted from the first representation to a common representation that is mapped to the first representation using an external configuration file. The common representation of the data is output to facilitate utilization of the data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an exemplary embodiment when read in conjunction with the accompanying drawings, wherein:

FIG. 3 is a block diagram that schematically illustrates a configuration file for converting an object representation to a common XMT representation according to an exemplary embodiment;

FIG. 4 illustrates an example of a handler definition according to an exemplary embodiment;

FIG. 5 illustrates an example of a handler definition for a Java™ object to assist in explaining an exemplary embodiment;

FIG. 6 illustrates a further example of a handler definition for a Java™ object to assist in explaining an exemplary embodiment;

DETAILED DESCRIPTION OF THE PREFERRED EMBODIMENT

Figure 1:
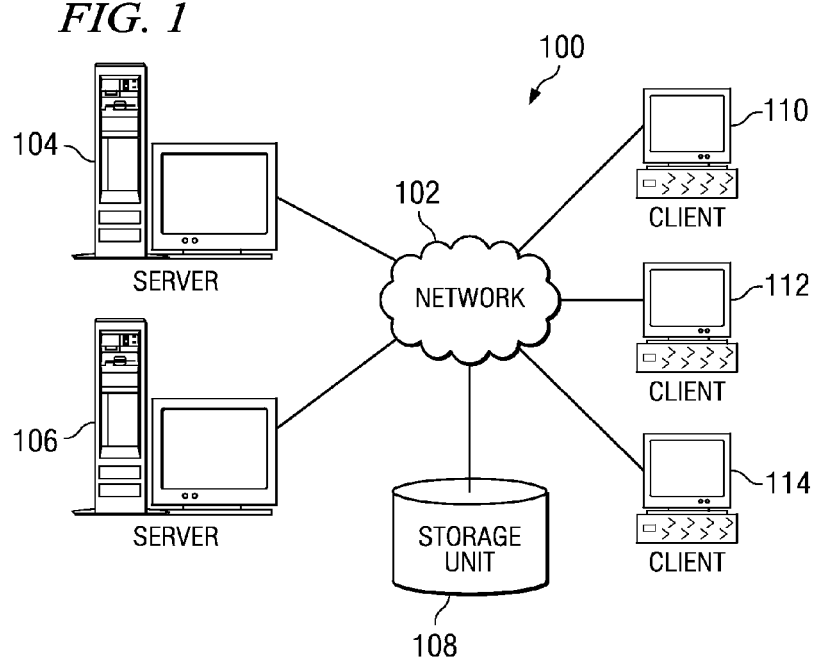
FIG. 1 is a pictorial representation of a network of data processing systems in which exemplary embodiments may be implemented.
Figure 2:
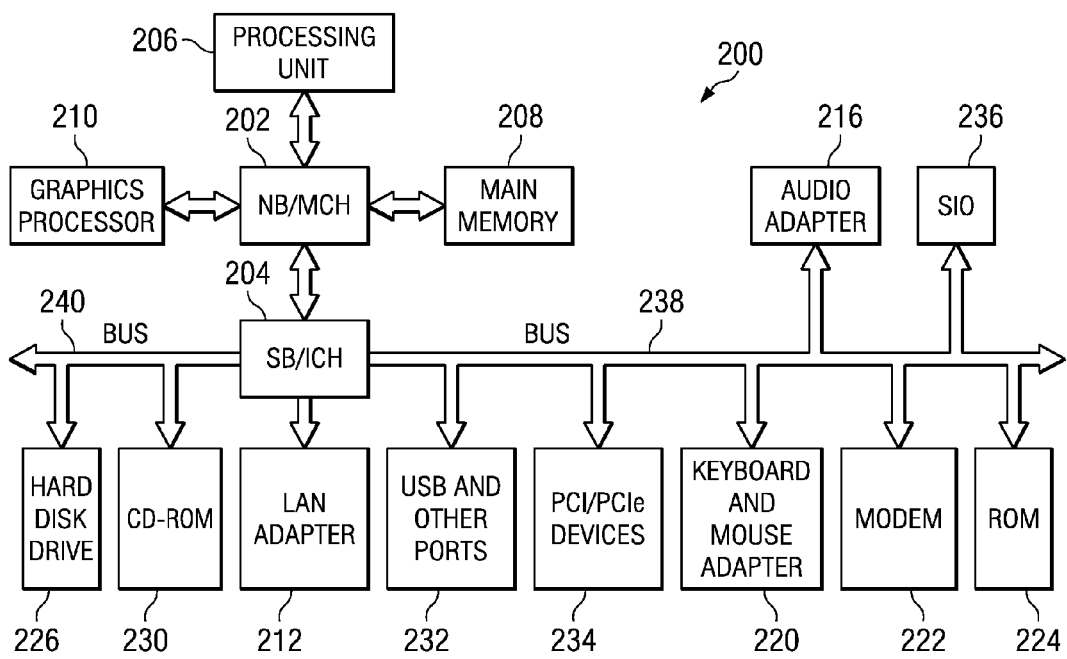
FIG. 2 is a block diagram of a data processing system in which exemplary embodiments may be implemented.

With reference now to the figures and in particular with reference to FIGS. 1-2, exemplary diagrams of data processing environments are provided in which exemplary embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which exemplary embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which exemplary embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Exemplary embodiments provide a computer implemented method, system and computer usable program code for facilitating utilization of data. In particular, exemplary embodiments provide a computer implemented method, system and computer usable program code for facilitating utilization of a complex data object, such as a Java™ object or an XML object, while, at the same time, providing access to runtime functions that the object provides.

According to an exemplary embodiment, flexible and efficient utilization of a complex data object is achieved by converting a received data object from a first representation to a common representation, wherein the common representation comprises a series of name-value pairs or "elements" which are dynamically extracted from the instance of the object. From this common representation, it is possible to convert to other representations suitable for a particular purpose at hand (including, for example, back to an instance of the object). The data to be extracted from each object is specified in an external configuration file, such that fine-grained control over the data can be achieved.

Exemplary embodiments provide a data conversion engine referred to herein as an "extensible Metatag Translation (XMT)" engine for translating Java™ objects into a series of "tags" or name-value pairs. The first part of the translation process is a conversion of an object to a common representation. In this regard, every converted object is referred to by an XMT type, and each object must be mapped to a single type. This mapping is done on a per-class basis, and multiple classes can be mapped to the same type. The type effectively represents a common-base class or implemented interface for all of the objects.

A difference between the storage process according to an exemplary embodiment and Java™ serialization (and other methods for storing objects) is that Java™ serialization writes out an implementation of class instances, whereas the XMT vehicle stores instructions about how to construct an implementation (XML, Java™ Object, a database record, Text) of the user information—not the object itself. Because the XMT format is implementation independent, flexibility is gained in the ability to persistently store the user data. Also, since the storage is not of an implementation, the ability is gained to easily convert to and from one implementation format (e.g., extensible Access Control Markup Language [XACML]) to another implementation format (e.g., Java™ object).

In an exemplary implementation, a complex type within XMT comprises a string value starting and ending with the '@' character. For example, Java™ Permission classes could be mapped to the XMT type "@Permissions@". A number of primitive types are defined for the basic Java™ primitives. One example of this is for the primitive 'int', which is represented by the type "@INT". The lack of a trailing '@' symbol represents the distinction between pre-defined primitive types and complex types representing Java™ objects. Complex types are reduced to primitive types through references within the XMT configuration.

The information that is needed to convert an object representation to the XMT common representation is specified in a configuration file. To convert an object, both the data to be extracted from Java™ classes and the available methods to re-instantiate these objects, given the data extracted, must be specified. Each class to be converted must have an entry in this file. The configuration document uses XML syntax, however, no schema or type-definition is provided as the names of the elements themselves are changed for parameters as will be explained below.

FIG. 3 is a block diagram that schematically illustrates a configuration file for converting an object representation to a common XMT representation according to an exemplary embodiment. The configuration file is generally designated by reference number 300 and contains two sections:

A <Handlers> section 310 which defines the objects and classes known to the XMT system, including parameters the objects require and the parameter types;

A <URNMappings> (A URN or Universal Resource Name is used in this context to uniquely represent data types within an XML representation of an object) section 320 to map between different representations of an XMT type, such as URNs and Java™ base class names.

Handlers section 310 contains the information that is required to convert Java™ objects into the common representation. Each XMT type has at least one handler. FIG. 3 illustrates XML/XMT type 302, Java™/XMT type 304 and Text/XMT type 306 having XML handler 312, Java™ handler 314 and Text handler 316, respectively. It should be understood, however, that this is intended to be exemplary only as handlers section 310 may also contain information needed to convert other XMT types as indicated by dashed line arrow 308 and associated handler 318.

Each handler 312, 314, 316 and 318 maps the combination of XMT type and Java™ class name to the following:

A list of parameters to be extracted from the objects and their types,

Definitions of methods used to construct instances of these objects based on these parameters.

Inasmuch as the handlers are defined on the basis of XMT type and class name, multiple handler sections can be defined for each XMT type. This allows for differences between classes of the type in both the extracted parameters and construction methods.

FIG. 4 illustrates an example of a handler definition according to an exemplary embodiment. More particularly, FIG. 4 illustrates a handler definition 400 that represents the five main JACC (Java™ Authorization Contract for Containers) permission types. The base element in definition 400 illustrated in FIG. 4, is the <Permission> element. The name of this element is the XMT type of the object without the preceding and trailing '@' symbols. The handler definition then contains three sections <Supported>, <Constructors> and <Properties>.

The <Supported> section contains the Java™ classes that this definition can be applied to, defined in a series of <ClassID> elements. This allows multiple handlers to be specified for the same XMT type, and the required handler to then be found based on both the type and the class of the object.

The <Constructors> section contains a list of possible methods for obtaining instances of the classes specified in the <Supported> section. Three methods can be used to obtain instances of a Java™ class: a standard public constructor; a static member variable of the class; or a static method of the class. These three types of constructors are defined in <Constructor>, <StaticMember> and <StaticMethod> tags, respectively.

The contents of the <Constructor> elements are comma-separated lists of values, each value representing a parameter listed in the <Properties> section to be described below. In other words, if the constructor string contains the value "@Parameter@" then the <Parameter> element should be looked for in the <Properties> section.

The <StaticMember> element contains the definition of a static member that can be accessed to retrieve an instance of the object. This is useful when the class implements the Singleton design pattern in the form of a private constructor and a publicly-accessible static member variable. The member name can be in terms of three parts: a prefix, a single parameter, and a suffix. The prefix and suffix are simply text, and the parameter is a value representing an element in the <Properties> section. For example, the class VirtualPrincipal contains three static member variables representing the three types of virtual principals, and a private constructor. The names of the member variables are the same as can be extracted using the 'getName( )' method from an instance of the class. Therefore, a parameter can be specified as <Name>@STRING</Name>; and the object can be constructed by retrieving the static member using the constructor <StaticMember>@Name@</StaticMemeber>.

The final constructor type is <StaticMethod>. This definition specifies a static method of the class and a series of parameters for the method, each parameter representing a definition from the properties section. An example of this could be a static method 'getInstance( )' that takes two parameters: Name and Value (extracted from the object). The constructor would be specified as <StaticMethod>getInstance (@Name@,@Value@)</StaticMethod>.

The <Properties> section defines and describes the parameters for the object. The contents of the <Properties> section is a series of text elements, where the name of the element is the name of the parameter and the text content is the XMT type of the parameter. This type can either be a primitive or the XMT type of another XMT-defined object.

The name of the parameter should match a 'getter' method for the object being defined. However, if the method used to extract the data required is not a standard 'getter' method, the actual name of a method can be specified. A method name is specified by prefixing the method with an underscore character. For example, if the method to be called is "String retrieveValue( )", the parameter would be specified as "<_retrieveValue>@STRING</_retrieveValue>".

Any null values returned from getters or specified methods are ignored by default. However, this can be overridden using setting the 'keepNulls' attribute to "true". When this attribute is present in the parameter definition, any null values returned from the method used to extract this parameter will be saved. For example: <Actions keepNulls="true">@>STRING</Actions> means that if the getActions( ) method returns a null value it will be saved regardless.

In addition to the parameters, each <Properties> section contains a <ClassName> element, whose content is the value "@CLASS_STRING". This element represents the actual class that the defined object represents, one of the possible classes from the <Supported> section.

FIG. 5 illustrates an example of a handler definition for a Java™ object to assist in explaining an exemplary embodiment. In particular, FIG. 5 illustrates a handler definition 500 for a Java™ object of the class "com.ibm.test.TestObject" with a single string parameter "Value" (with associated constructor and getter method), and assuming the XMT type of this object is @Test@.

FIG. 6 illustrates a further example of a handler definition for a Java™ object to assist in explaining an exemplary embodiment. In particular, consider a Java™ object of the class "com.ibm.test.WrappedTestObject" that took a single parameter "Wrapped" of the type "TestObject" defined above. Assuming this object is of the XMT type "@WrappedTest@", the XMT handler definition 600 is as shown in FIG. 6. This shows how XMT handler definitions can reference other handler definitions—the <Wrapped> parameter element contains the value "@Test@" which is the XMT type of the TestObject class described above.

Returning to FIG. 3, mappings section 320 of XMT configuration file 300 defines mappings between different representations or names for an XMT type. These mappings allow 'look up' of the XMT type of an object during the conversion process.

In the default configuration, mappings are provided for Universal Resource Names (URNs) and Java™ base classes/interfaces (or "default types"). For instance, to convert a Java™ object to an XMT object, the XMT type can be looked up using the Java™ object's base class.

The mapping section is contained within one or more <URNMapping> elements. These elements contain multiple <Mapping> children, representing an individual mapping between an XMT type and another name such as a URN or a Java™ base classes. XMT types are contained in <Type> child of a <Mapping> element; URNs are represented by <URN> elements; and base classes by <DefaultType> elements. However, other mappings can be added if required for other conversions at a later date.

Figures 7, 8:
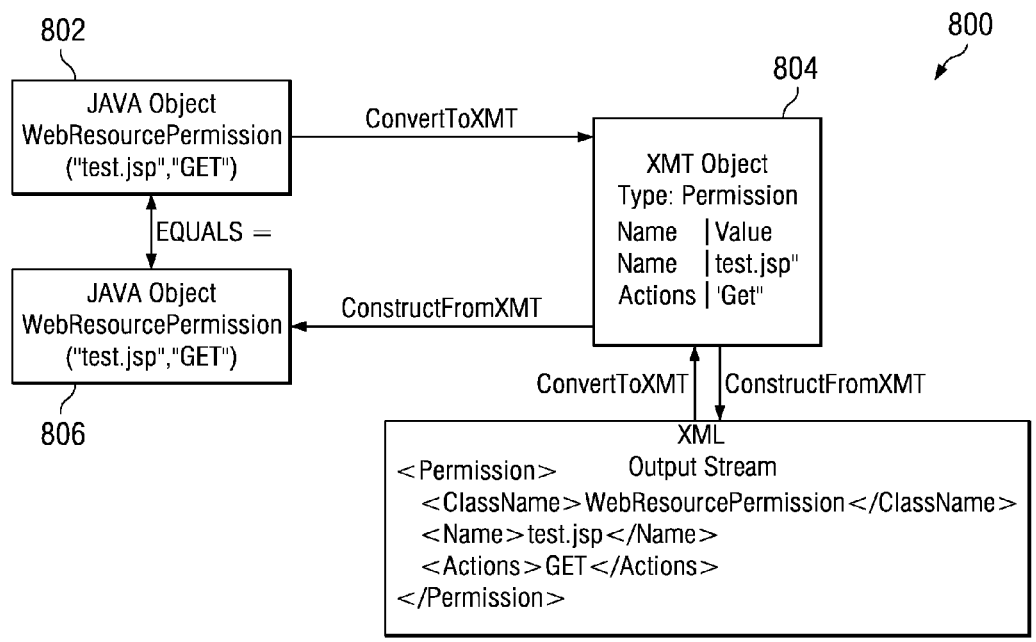
FIG. 7 illustrates a mapping definition for an XMT simple type "@STRING" to assist in explaining an exemplary embodiment.
FIG. 8 is a diagram that schematically illustrates conversion between a Java™ object and a common representation according to an exemplary embodiment.

For example, FIG. 7 illustrates a mapping definition, generally designated by reference number 700, for an XMT simple type "@STRING" to assist in explaining an exemplary embodiment.

In order to convert between the XMT common representation and external representations, including instances of the Java™ object; it is first necessary to define the common representation. As described above, the common representation consists of an XMT type and a series of elements (name-value pairs). The common representation is simply a Java™ object holding this data.

FIG. 8 is a diagram that schematically illustrates conversion between a Java™ object and a common representation according to an exemplary embodiment. The conversion process is generally designated by reference number 800, and illustrates conversion of Java™ object 802 to a common representation 804 called XMTObject in this implementation. Methods are provided for retrieving the type of the object as well as adding and removing elements. For example, to add a parameter to an object we would call the addElement (String key, String value) method. These elements are stored internally as a HashMap.

The first stage of any conversion, whether it be from a Java™ object or any other representation, to the common representation is to determine the XMT type of the object being converted. The configuration file provides a mapping section to configure mappings between XMT types and external values. In the case of converting a Java™ object the external value will be the base class of the object.

Figures 9, 10:
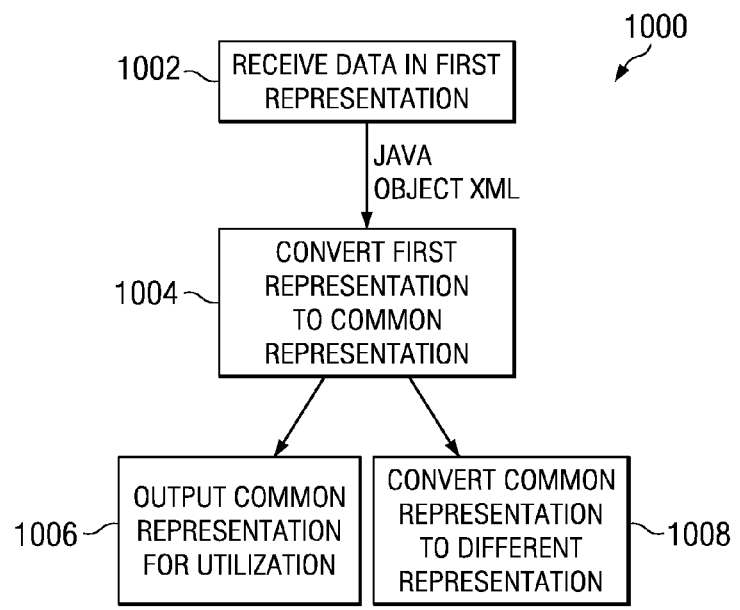
FIG. 9 illustrates an example of a mapping for converting a Java™ object to an external value to assist in explaining an exemplary embodiment.
FIG. 10 is a flowchart that illustrates a method for facilitating utilization of data according to an exemplary embodiment.

An example of this is shown in FIG. 9 which illustrates a mapping 900 for converting a Java™ object to an external value to assist in explaining an exemplary embodiment.

In order to convert an instance of the Java™ J2EE security permission class: Java™ x.security.jacc.WebResourcePermission (a subclass of Java™ .security.Permission) the <DefaultType> mapping is searched to find that the base class maps to the XMT type "@Permission@". The mapping definition also shows a URN is mapped to this XMT type—this is used for the conversion of the XML representation of the object to the common representation (discussed below).

Once the XMT type of the converted object has been determined, the required parameters can be extracted from the object and added as elements. This is a three stage process:

determining the parameters to convert; extracting and converting each parameter to the required type; and saving the converted parameter.

To determine the parameters to extract, the XMT configuration file is queried to find the <Handler> that is defined for the class being converted. The name of the class being converted must therefore be part of the representation being converted from. While this is not an issue for the conversion from a Java™ object, all other representations must contain the class name in some way.

The found handler definition contains a <Properties> section, containing a list of parameters and their types. As described above, each parameter is in the format <[Name]>[Type]</[Name]>; where [Name] is the name of the parameter and [Type] is the XMT type that the extracted parameter should be converted to. If no handler can be found, the conversion process cannot continue.

The second stage of the process is then to extract and convert the parameter. In the case of the conversion from a Java™ object, the parameter is extracted by invoking a method call on the object—either a 'getter' method (determined by prefixing 'get' to the parameter name) or, if the parameter is prefixed with an underscore, a method with the name of the parameter itself. Once the parameter has been extracted, the conversion process on the extracted data can be recursively called to convert it to an XMTObject (if the parameter is another XMT-defined class) a String (if the object is a primitive) or a Set of either XMTObjects or Strings (if the method returned a Set).

Once the object has been converted, the final stage is to store the converted data in the XMTObject. This is achieved by simply calling the addElement( ) method, and using the name of the parameter as the element name.

Once all the parameters have been extracted, converted and stored, the conversion process is complete. Converting from the common representation, illustrated at 806 in FIG. 8, is basically the same process-extract and convert each parameter to the required format one-by-one. However, if converting to a Java™ object a constructor must also be found that matches the defined parameters. These constructors are defined in the <Constructors> section of the handler. The types of constructors were discussed previously.

FIG. 10 is a flowchart that illustrates a method for facilitating the utilization of data according to an exemplary embodiment. The method is generally designated by reference number 1000, and begins by receiving data in a first representation, for example, as a Java™ object or an XML object (Step 1002). The received first representation of the data is then converted to a common representation that is mapped to the first representation (Step 1004). As indicated previously, this is done by determining a type of data object to be converted, identifying parameters for the determined type of data object, and converting the determined parameters to provide the common representation The common representation of the data is then output (Step 1006) to facilitate utilization of the data, for example, manipulating, searching or storing of the data; and, at the same time, enables the data object to be converted to a different representation, if desired, including back to the first representation (Step 1008).

Exemplary embodiments thus provide a computer implemented method, system and computer usable program code for facilitating utilization of data. A computer implemented method for facilitating utilization of data includes receiving data, wherein the received data is in a first representation. The received data is converted from the first representation to a common representation that is mapped to the first representation using an external configuration file. The common representation of the data is output to facilitate utilization of the data.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for facilitating utilization of data, the computer implemented method comprising:

receiving data, wherein the received data is in a first representation, and wherein the first representation is an instance of a data object;

converting the received data from the first representation to a common representation, wherein the common representation is mapped to the first representation using an external configuration file that stores instructions for constructing an implementation of the data object and comprises a set of handlers and a mapping method, wherein each handler of the set of handlers is associated with a type for the common representation, and wherein the common representation comprises name-value pairs that are dynamically extracted from the instance of the data object, and wherein the mapping method provides a mapping between the type and an external value that identifies the data object, and wherein converting the received data from the first representation to the common representation comprises determining a type of the data object, identifying parameters for the determined type of the data object, retrieving the identified parameters from the instance of the data object and converting the identified parameters to the name-value pairs to provide the common representation; and outputting the common representation of the data to facilitate utilization of the data.

2. The computer implemented method of claim 1, wherein a given handler of the set of handlers references another handler of the set of handlers.

3. The computer implemented method of claim 2, wherein each handler of the set of handlers specifies data to be extracted from the instance of the data object.

4. The computer implemented method of claim 1, wherein the data object comprises one of an object-oriented programming language object and an eXtensible Markup Language object.

5. The computer implemented method of claim 1, wherein determining the type of the data object, comprises:
determining the type of the data object to be converted among a plurality of data objects identified by the external configuration file, and wherein identifying the parameters for the determined type of the data object comprises identifying parameters for the determined type of the data object from the external configuration file using a given handler that is selected from the set of handlers based on the determined type of the data object.

6. The computer implemented method of claim 1, and further comprising:
converting the data from the common representation to a different representation of the data.

7. The computer implemented method of claim 6, wherein the different representation comprises the first representation.

8. A computer program product, comprising:
a non-transitory computer usable medium having computer usable program code configured for facilitating utilization of data, the computer program product comprising:
computer usable program code configured for receiving data, wherein the received data is in a first representation, and wherein the first representation is an instance of a data object;
computer usable program code configured for converting the received data from the first representation to a common representation, wherein the common representation is mapped to the first representation using an external configuration file that stores instructions for constructing an implementation of the data object and comprises a set of handlers and a mapping method, wherein each handler of the set of handlers is associated with a type for the common representation, and wherein the common representation comprises name-value pairs that are dynamically extracted from the instance of the data object, and wherein the mapping method provides a mapping between the type and an external value that identifies the data object, and wherein converting the received data from the first representation to the common representation comprises determining a type of the data object, identifying parameters for the determined type of the data object, retrieving the identified parameters from the instance of the data object and converting the identified parameters to the name-value pairs to provide the common representation; and
computer usable program code configured for outputting the common representation of the data to facilitate utilization of the data.

9. The computer program product of claim 8, wherein a given handler of the set of handlers references another handler of the set of handlers.

10. The computer program product of claim 9, wherein each handler of the set of handlers specifies data to be extracted from the instance of the data object.

11. The computer program product of claim 8, wherein the data object comprises one of an object-oriented programming language object and an eXtensible Markup Language object.

12. The computer program product of claim 8, wherein the computer usable program code configured for determining the type of the data object, comprises:
computer usable program code configured for determining the type of the data object to be converted among a plurality of data objects identified by the external configuration file, and wherein the computer usable program code configured for identifying the parameters for the determined type of the data object comprises:
computer usable program code configured for identifying parameters for the determined type of the data object from the external configuration file using a given handler that is selected from the set of handlers based on the determined type of the data object.

13. The computer program product of claim 8, and further comprising;
computer usable program code configured for converting the data from the common representation to a different representation of the data.

14. The computer program product of claim 13, wherein the different representation comprises the first representation.

15. A computer system having a processor, in a data processing system, for facilitating utilization of data, the system comprising:
an input for receiving data, wherein the received data is in a first representation, and wherein the first representation is an instance of a data object;
a conversion mechanism for converting the received data from the first representation to a common representation, wherein the common representation is mapped to the first representation, wherein the conversion mechanism comprises an external configuration file that stores instructions for constructing an implementation of the data object and comprises a set of handlers and a mapping method, wherein each handler of the set of handlers is associated with a type for the common representation, and wherein the common representation comprises name-value pairs that are dynamically extracted from the instance of the data object, and wherein the mapping method provides a mapping between the type and an external value that identifies the data object, and wherein converting the received data from the first representation to the common representation comprises determining a type of the data object, identifying parameters for the determined type of the data object, retrieving the identified parameters from the instance of the data object and converting the identified parameters to the name-value pairs to provide the common representation; and an output for outputting the common representation of the data to facilitate utilization of the data.

16. The computer system of claim 15, wherein a given handler of the set of handlers references another handler of the set of handlers.

17. The computer system of claim 16, wherein each handler of the set of handlers specifies data to be extracted from the instance of the data object.

18. The computer system of claim 15, wherein the conversion mechanism further comprises a mechanism for converting the data from the common representation to a different representation of the data.

* * * * *